United States Patent [19]

Binnewies et al.

[11] 4,361,359
[45] Nov. 30, 1982

[54] WHEEL COVER FOR A PASSENGER MOTOR VEHICLE

[75] Inventors: Hartmut Binnewies, Wolfschlugen; Bernd Löper, Korb, both of Fed. Rep. of Germany

[73] Assignee: Daimler-Benz A.G., Stuttgart, Fed. Rep. of Germany

[21] Appl. No.: 211,903

[22] Filed: Dec. 1, 1980

[30] Foreign Application Priority Data

Dec. 1, 1979 [DE] Fed. Rep. of Germany ....... 2948448

[51] Int. Cl.³ .................................................. B60B 7/06
[52] U.S. Cl. ............................ 301/37 PB; 301/37 R; 301/37 P
[58] Field of Search ................. 301/37 R, 37 P, 37 T, 301/37 C, 37 CD, 37 TP, 37 PB, 37 B, 108 R, 108 A

[56] References Cited

U.S. PATENT DOCUMENTS

| 3,317,248 | 5/1967 | Dully ................................. 301/37 R |
| 3,348,885 | 10/1967 | Dully et al. .................... 301/37 CD |
| 3,773,389 | 11/1973 | Foster et al. ....................... 301/37 R |
| 3,773,390 | 11/1973 | Foster et al. ....................... 301/37 R |
| 4,231,619 | 11/1980 | Beisch et al. ...................... 301/37 R |

Primary Examiner—Charles A. Marmor
Attorney, Agent, or Firm—Paul M. Craig, Jr.

[57] ABSTRACT

A wheel cover for wheels of a passenger motor vehicle which includes a mounting arrangement formed of several retaining elements located on the wheel cover. The retaining elements are adapted to engage in groove-shaped recesses in a wheel rim by means of flexible locking elements. The retaining elements are provided with opposite bearing portions that are associated with each of the locking elements, with the opposite bearing portion supporting themselves at a dish of the wheel.

14 Claims, 1 Drawing Figure

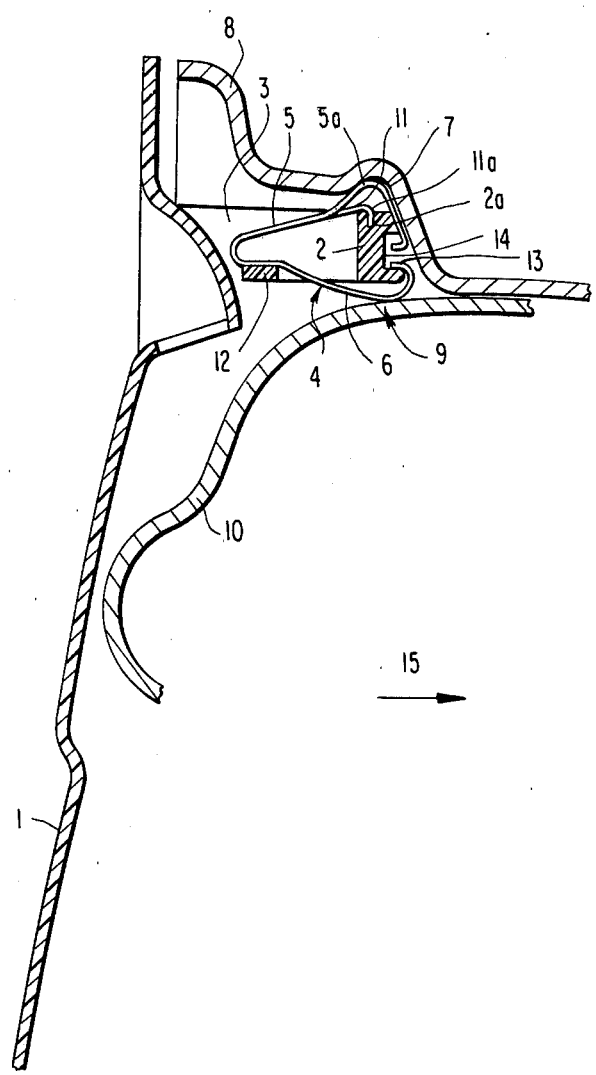

WHEEL COVER FOR A PASSENGER MOTOR VEHICLE

The present invention relates to a wheel cover and, more particularly, to a wheel cover or hub cap for a passenger motor vehicle which includes a mounting formed of several retaining elements located on the wheel cover, which retaining elements are adapted to engage into a groove-shaped recess provided in a wheel rim by means of flexible locking elements.

In German Gebrauchsmuster No. 1 975 618, an arrangement is proposed wherein wheel covers made of metal or plastic are fastened by means of retaining springs in order to cover the outside of wheels of a motor vehicle for aesthetic purposes. A disadvantage of this proposed arrangement resides in the fact that, due to the existence of manufacturing tolerances and due to the different coefficients of thermal expansion of the parts used in manufacturing, the retaining spring must exhibit a relatively high force with respect to the wheel cover and/or the wheel rim if a secure mounting of the wheel cover on the rim is to be ensured. For this purpose, either very strong springs must be selected or a spring flexion must be provided that is so large that the necessary cohesive force can be obtained. In this situation, it is a disadvantage that all the cohesive forces of the wheel cover in the wheel must be absorbed by the wheel cover itself.

In U.S. Pat. No. 2,746,805, a mounting system for wheel covers is proposed wherein a radially flexible ring or wire is provided for fastening of the wheel cover. With such a proposed fastening arrangement, the forces exercised by the mounting points on the wheel rim are absorbed by the flexible ring of wire itself. The disadvantage of this proposed construction resides in the fact that relatively high manufacturing expenses are incurred for constructing the wheel cover and ring of wire.

The aim underlying the present invention essentially resides in providing a wheel cover for passenger motor vehicles which includes a mounting of the aforementioned type wherein mounting forces may be absorbed without placing these forces on the wheel cover itself.

In accordance with advantageous features of the present invention, retaining elements are provided with opposite bearing parts associated with the retaining elements, which bearing parts support themselves on a dish of the wheel. By virtue of this arrangement, it is possible for the mounting forces and counteracting forces to be directly introduced into the hub of the wheel itself so that the wheel cover may be held without stress when the retaining elements provide the corresponding axial mounting.

To achieve the direct introduction of the mounting forces and counteracting forces into the hub itself, in accordance with the present invention, the retaining elements may be formed as U-shaped springs having a radially outer leg which, in a conventional manner, engages an inside groove of a rim of the wheel and a radial inner leg which presses a surface at a dish of the wheel that radially faces to the outside. This arrangement introduces the clamping forces that are exercised by the U-shaped spring exclusively into the parts of the wheel itself and the wheel cover which, in this case, could be made of a plastic material, will not be stressed by the clamping forces, thereby avoiding the possible damaging and affecting of the plastic parts by the holding forces.

In order to enable a mounting of the U-shaped spring on the wheel cover, in accordance with further advantageous features of the present invention, at least one retaining bridge is provided for each U-shaped spring, with the retaining bridge being worked out by, for example, a punching out or the like, of one of the two legs and being adapted to be expediently engageable in a pocket at the retaining ring of a wheel cover. By virtue of this arrangement, a guiding of the wheel cover in an axial, radial, as well as a circumferential direction is ensured.

The retaining bridges may be constructed in accordance with the present invention in such a manner that the retaining ring in a radial direction only takes over very slight elastic forces. Moreover, a turning of the wheel cover in a circumferential direction may be limited by the width of the pocket. Additionally, both legs of the U-shaped spring may, on the inside or the outside, reach over the retaining ring of the wheel cover and may, at their ends, with bent hook-shaped parts, engage in an axially directed groove of the retaining ring that is so wide that a radial spring action of the legs that reachs to the impact of the hooks on the grooved walls is possible. This construction has the advantage that the U-shaped retaining springs may be inserted in the wheel cover in a prestressed condition so that, during an assembly, advantages may be obtained in regard to the deflection of the spring that has to occur as already proposed in other commonly assigned patent applications.

In order to prevent the U-shaped retaining spring from tilting away during a mounting of the wheel cover to the wheel, advantageously in accordance with still further features of the present invention, a guide ring is associated with the retaining ring with the guide ring also being connected with the wheel cover and at which one leg of the U-spring may be placed. The guide ring may be arranged on that side of the retaining ring that is turned away from the wheel rim, in which case, the groove into which the hooks that are bent at the free end of the two spring legs engage, is axially open in a direction of the rim of the wheel and the guide ring is located on that side of the retaining ring that is turned away from the wheel rim.

Accordingly, it is an object of the present invention to provide a wheel cover for wheels of a passenger motor vehicle which enables a direct introduction of the mounting forces and counteracting forces into a hub of the wheel.

A further object of the present invention resides in providing a wheel cover for wheels of a passenger motor vehicle which enables the mounting of the wheel cover without stress on the wheel cover itself.

A further object of the present invention resides in providing a wheel cover for wheels of a passenger motor vehicle which is simple in construction and therefore relatively inexpensive to manufacture.

A still further object of the present invention resides in providing a wheel cover for wheels of a passenger motor vehicle which ensures a secure mounting of the wheel cover to a rim of the wheel.

These and other objects, features, and advantages of the present invention will become more apparent from the following description when taken in connection with the accompanying drawing which shows, for the purposes of illustration only, one embodiment in accordance with the present invention, and wherein:

The single FIGURE of the drawing is a radial cross-sectional view through a wheel axle and a part of a wheel cover for a wheel of a passenger motor vehicle constructed in accordance with the present invention.

Referring now to the single FIGURE of the drawing, according to this FIGURE, a wheel cover or hub cap 1, cast in one piece of a plastic material, has a retaining ring 2 which, at a distance from an outside contour of the wheel cover 1, is held by bridges 3. U-shaped retaining springs generally designated by the reference numeral 4 are provided with the springs 4 including legs 5 which are adapted to spring radially outwardly and legs 6 which are adapted to spring radially inwardly. The U-shaped retaining springs 4 are mounted on the retaining ring 2 and enable a fastening of the wheel cover 1 to the wheel of the motor vehicle.

The fastening of the wheel to the wheel cover occurs because both legs 5, 6 of the retaining springs 4 exhibit radially directed forces. The outside leg 5 is provided with a curvature 5a which is correspondingly directed to the outside and, in a conventional manner, the outside leg 5 engages in an inside groove 7 provided in a rim 8 of the wheel. The counter forces are applied by the inner leg 6 of the retaining spring 4 which supports itself on a surface 9 of a wheel dish 10 that points radially to the outside. Additionally, the retaining spring 4 is provided with a retaining bridge 11. The retaining bridge 11 may, for example, be punched out of the leg 5 pressing radially outwardly with a hook-shaped end 11a of retaining bridge 11 engaging in a pocket 2a provided in the retaining ring 2.

In the illustrated embodiment, the pocket 2a is located at an outside circumference of the retaining ring 2. The pocket 2a has a circumferential width which is adapted to a width of the hook-shaped end 11a. Consequently, the spring 4 is secured at the wheel cover 1 in a radial and axial direction as well as in a circumferential direction. A guide ring 12 is provided at the bridges 3 of the wheel cover 1. A part of the leg 6 of the retaining spring 4 that is directed to the inside is supported on the guide ring 12.

Both free ends of the legs 5, 6 are provided with approximately axially directed hook parts 13. The hook parts 13 are bent off the free end of the respective legs 5, 6 and engage in a groove 14 provided in the retaining ring 2. The groove 14 is axially open in a direction of the wheel rim 8. In the illustrated position, where the wheel cover is mounted to the wheel, both hooks 13 are located at a distance from the radially inner and radially outer walls of the groove 14. When the wheel cover 1 is taken off, the hooks 13 are placed at the corresponding radial walls of the groove 14 and thus hold the retaining spring 4 in a certain prestressed condition.

The above-noted construction of the present invention has the advantage that, at the time of mounting of the wheel cover 1 to the wheel, no large deflection of the spring is necessary in order to be able to apply the necessary retaining forces and nevertheless the retaining springs 4 may have a relatively soft spring characteristic. The above-noted guide ring 12 is provided in order to prevent the retaining springs 4 from tilting away and disengaging themselves with their bridge 11 or with the hook parts 13 from the retaining ring 2 at a time of mounting of the wheel cover 1 to the wheel.

With the embodiment illustrated in the drawing, when the wheel cover 1 is pressed on the wheel in a direction of the wheel axle that corresponds to the direction of the arrow designated by the reference numeral 15, the curvatures 5a of the outside leg 5 of the retaining spring 4 snap into the inside groove 7 of the wheel rim 8 and are held in this position by the counter forces generated by the leg 6 of the retaining spring 4. The guide ring 12 avoids a tilting of the retaining springs 4 in a counterclockwise direction. At a dismounting or removal of the wheel cover 1 from the wheel takes place in the reverse manner.

The retaining spring 4 may be constructed in such a way that, in the illustrated mounted position, as well as especially when the hook parts 13 are placed at the radially outer and inner walls of the groove in an unmounted condition, a certain prestressed effect exists between the outside leg 5 and the retaining bridge 11 which provides for a perfect hold of the retaining springs 4 on the retaining ring 2 and a rattle-free fit. The interaction between the retaining bridge 11 and the lower spring leg 6 contributes to a perfect positioning of the retaining springs.

The present invention provides a wheel cover which, after a mounting, is not stressed by retaining forces. Without consideration of the mounting forces, the wheel cover 1 may also be manufactured of materials that are not readily suitable to withstand large pressure or tension forces.

While we have shown and described only one embodiment in accordance with the present invention, it was understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A wheel cover for wheels of a passenger motor vehicle, the wheel cover including means for mounting the wheel cover to a wheel of the vehicle, the mounting means includes a plurality of retaining means located on the wheel cover, and locking elements adapted to engage in a recess of a rim of the wheel, characterized in that the retaining means further includes a bearing means associated with each locking element and adapted to be supported at a dish of the wheel, each of the retaining means are formed as a U-shaped retaining spring, the locking elements are formed by a radially outer leg of the retaining spring, the bearing means are formed by a radially inner leg of the retaining spring, the radially inner leg being adapted to press against a radially outwardly directed surface of the dish of the wheel, the radially inner and radially outer legs of each of the retaining springs respectively extend over a radially inner and a radially outer surface of the retaining ring, means are provided at the free ends of the respective legs for engaging the retaining ring, means are provided in the retaining ring for accommodating the engaging means including an axially extending groove having a predetermined width so as to enable a radial spring action of the legs of the retaining spring which is sufficient for the engaging means to contact inner walls of the axially extending grooves.

2. A wheel cover according to claim 1, characterized in that the mounting means further includes a retaining ring, a retaining bridge is formed in one of the legs of the retaining spring, and in that the retaining bridge engages a portion of the retaining ring.

3. A wheel cover according to claim 2, characterized in that the retaining bridge is punched out of one of the legs of the retaining spring.

4. A wheel cover according to claim 3, characterized in that the retaining bridge is punched out of the radially outer leg of the retaining spring.

5. A wheel cover according to claim 4, characterized in that the retaining ring is provided with a pocket for accommodating a portion of the retaining bridge so as to secure the retaining spring in a radial and axial direction.

6. A wheel cover according to claim 5, characterized in that the pocket has a circumferential width corresponding to a width of a portion of the retaining bridge accommodated therein.

7. A wheel cover according to claim 1, characterized in that the engaging means are formed as bent hook portions on the respective free ends of the legs of the retaining spring.

8. A wheel cover according to claim 7, characterized in that the axially extending groove is open in a direction toward the rim of the wheel.

9. A wheel cover according to claim 8, characterized in that a guide means is connected to the wheel cover and is disposed so as to guide a positioning of at least a portion of the retaining spring.

10. A wheel cover according to claim 9, characterized in that the guide means is disposed on a side of the retaining ring facing away from the rim of the wheel, and in that the portion of the retaining spring positioned by the guide means is a bight portion joining the two legs of the retaining spring.

11. A wheel cover according to claim 10, characterized in that the guide means is arranged in such a manner that the bight portion rests on the guide means in an area of the radially inner leg.

12. A wheel cover according to claim 1, characterized in that means are provided for guiding the retaining spring.

13. A wheel cover according to claim 12, characterized in that the guiding means is disposed on a side of the retaining ring facing away from the wheel rim, and in that a portion of the retaining spring rests on the guide ring.

14. A wheel cover for wheels of a passenger motor vehicle, the wheel cover including means for mounting the wheel cover to a wheel of the vehicle, the mounting means includes a plurality of retaining means located on the wheel cover, and locking elements adapted to engage in a recess of a rim of the wheel, characterized in that the retaining means further includes a bearing means associated with each locking element and adapted to be supported at a dish of the wheel, each of the retaining means are formed of a U-shaped retaining spring, the locking elements are formed by a radially outer leg of the retaining spring, the bearing means are formed by a radially inner leg of the retaining spring, the radially inner leg being adapted to press against a radially outwardly directed surface of the dish of the wheel, means are provided for guiding the retaining spring, the guiding means is disposed on a side of the retaining ring facing away from the wheel rim, a portion of the retaining spring rests on the guide means, and in that the portion of the retaining ring resting on the guiding means is a portion of the radially inner leg located in an area of a bight portion joining the two legs of the retaining spring.

* * * * *